June 24, 1930.  J. L. DELPINI  1,766,506
TRANSPORT VEHICLE AND THE LIKE
Filed Oct. 29, 1925   2 Sheets-Sheet 1
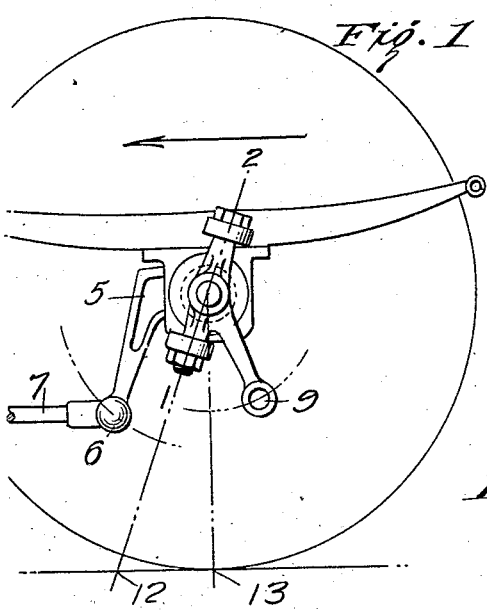
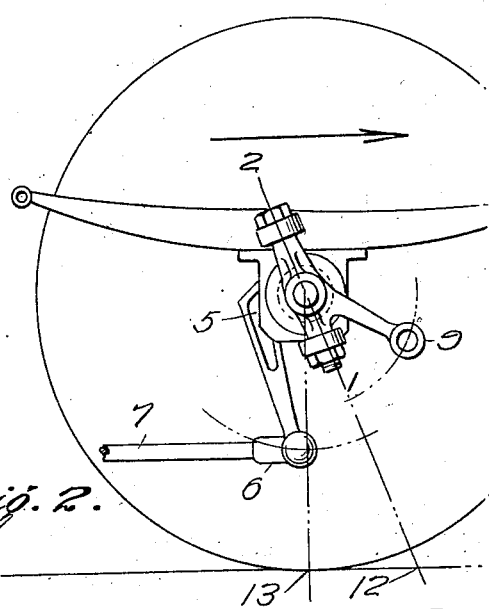
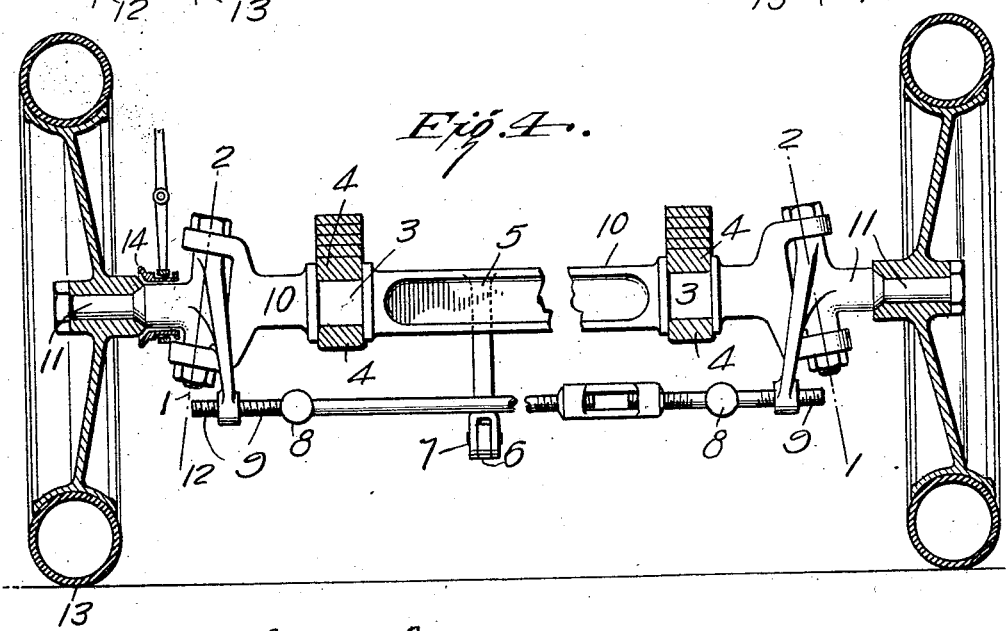
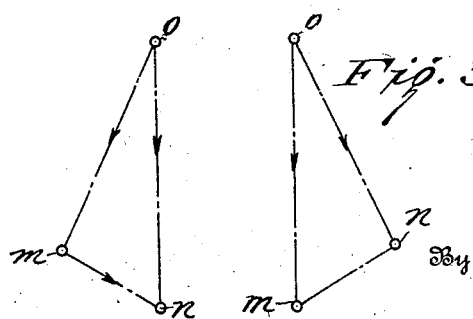
Inventor
J. L. DELPINI,
By Emil Bönnelycke
Attorney June 24, 1930.  J. L. DELPINI  1,766,500
TRANSPORT VEHICLE AND THE LIKE
Filed Oct. 29, 1925  2 Sheets-Sheet 2
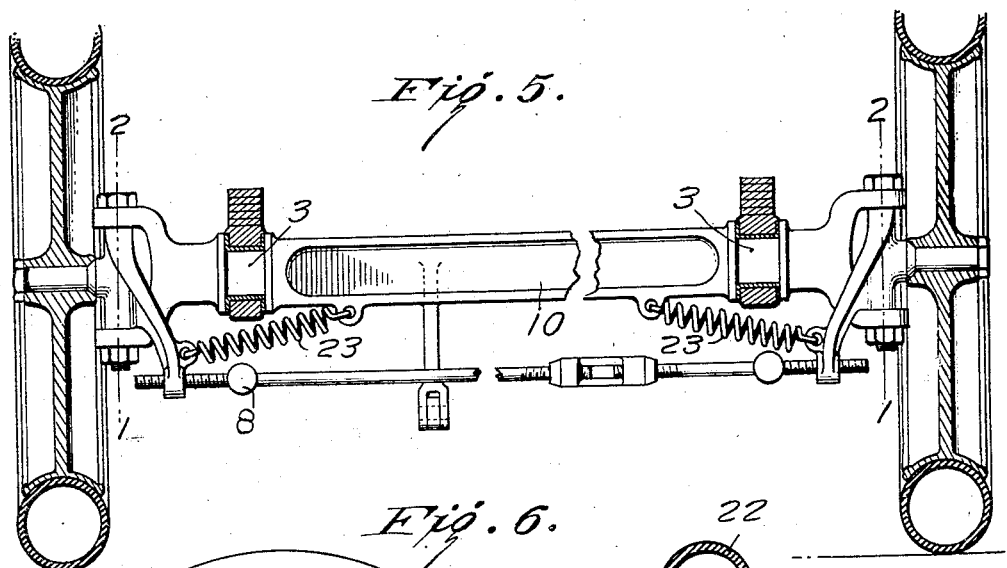
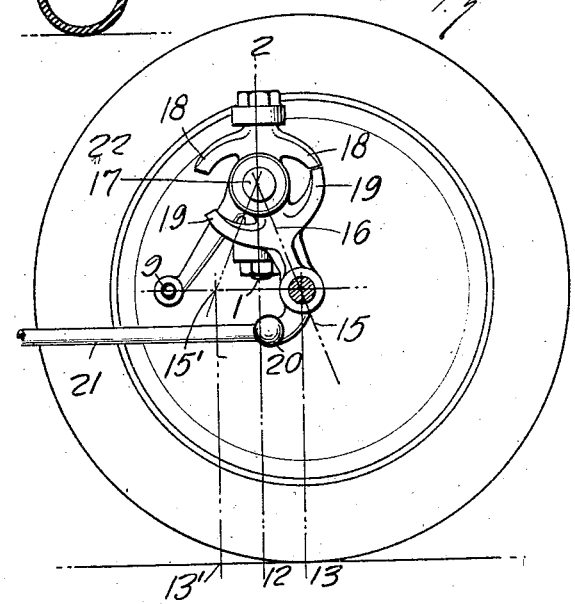
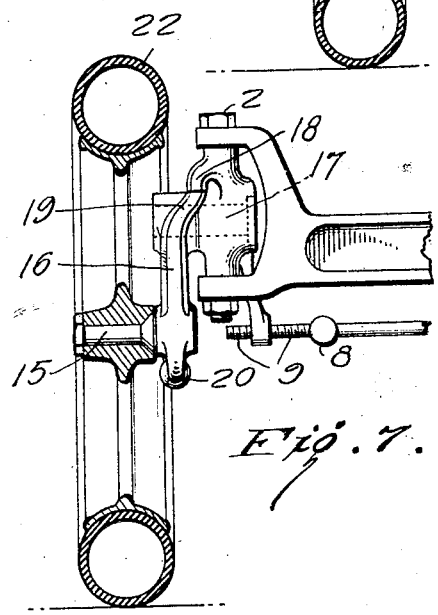
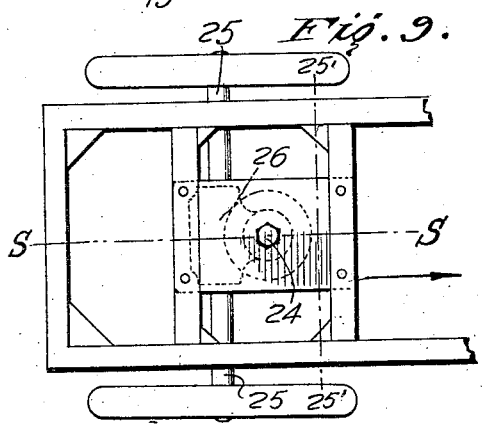
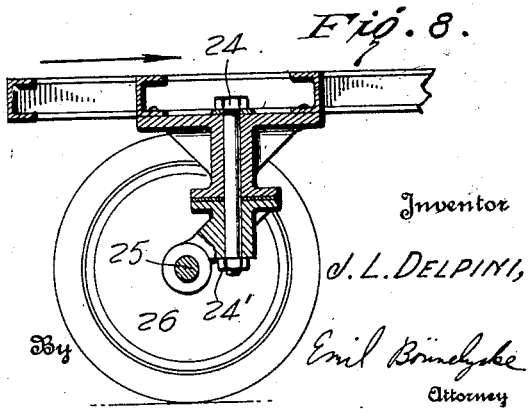
Inventor
J. L. DELPINI,
By Emil Brinelyke
Attorney Patented June 24, 1930

1,766,506

UNITED STATES PATENT OFFICE

JOSÉ LUIS DELPINI, OF BUENOS AIRES, ARGENTINA

TRANSPORT VEHICLE AND THE LIKE

Application filed October 29, 1925. Serial No. 65,666.

The present invention relates to an axle construction for vehicles and trucks and consists in such details as the specific mounting thereof. It is, therefore, an object of the invention to mount the axle in aligned, horizontal bearings and further objects reside in the construction and relation of the spindles and other means, which will be explained and described in the following.

The invention will be fully explained with reference to the accompanying drawings, in which:

Figures 1 and 2 show side views of one of the ways in which the invention is carried out in practice.

Figure 3 is a diagram to facilitate the understanding of the embodiments shown in Figures 4 and 5.

Figure 4 is a front view of the construction shown in Figs. 1 and 2.

Figure 5 is a front view of a modified form.

Figure 6 is a side view of a further modified construction.

Figure 7 is a front view partly in section of the form of Fig. 6.

Figure 8 is a section on line S—S of Fig. 9 of a further modified embodiment.

Figure 9 is a plan view of the form of Fig. 8.

My invention essentially consists of an additional or supplementary axle, provided with such devices that will permit the wheels to be automatically steered when running backwards and forward.

Referring to Figs. 1 to 5 the axle 10 which supports the wheel supports 11 at its ends and the corresponding wheels, can turn horizontally around the bearings 3 in order that the plane which passes through the axles 1—2 of the wheel pivots, will be able to adopt two different positions, as it is clearly seen in Figures 1 and 2, and this by only moving over the arms 5 and 6 by means of the bars 6 and 7 which can be handled from the driver's seat of the vehicle. It is evident that it will be possible to dispense with the driver's effort to handle the arms 5 and 6, by using a small additional clutch member which has been schematically shown and is indicated by the numeral 14 on Figure 4. Thus, the driver, through a system of levers and shafts, not shown on the drawings, operates the clutch member 14, keyed on support 11, (which has been shown as a type embodying coaxial cones, but they can be of any suitable type) which completely grips the wheel with the wheel support 11, and therefore with the axle 10. Under these conditions it is the track resistance which, acting on the point 13, effects the change of direction or position of axle 1—2. It is to be understood that, for effecting this movement, the shaft—6-7 or any other device which may be adopted for fixing the position of the longitudinal plane, determined by the pivoted axles 1—2 of axle 10, must be left free.

Figure 1 shows the position of the pivoted axle 1—2 that corresponds to the movement of the vehicle in the direction shown by the arrow and Figure 2 the position that corresponds to the movement in the opposite direction. In both cases, the steering is obtained by the fixing of the resting point 13 of each wheel, behind the point 12 where the pivoted axle 1—2 cuts the surface of the truck. The mechanical effect produced thereby is obvious. The pressure exerted by the track, working on 13, beyond and behind the pivoting axle 1—2, promotes with relation to this axle 1—2, a stabilizing moment which causes each wheel to be forced to follow the last element of the curb followed by that part of the frame to which it belongs and is fixed, just in the same manner as if each wheel were trailed by the vehicle, that is to say, each of the wheels operate in a manner as though it were a real traction wheel.

Now as the deflection of the pivotal axle 1—2 of each wheel, gives rise to a component $m\ n$ of the weight which gravitates upon each wheel support, see Figure 3, which component cannot be eliminated or supported by the reactions of the bearings or bushes of the axle 1—2, it is clear that the group fromed by the whole of the supplementary axle 10 and its two wheels, will be in an unstable balance. In order to eliminate this unstable balance, I may use several means two of which have been shown in Figures 4 and 5. One is shown in Figure 4 and consists in the well known means of deflecting the pivot spindles of the wheels with relation to the pivot axle 1—2, as may be clearly seen from said Figure 4; for any turning of the wheels around the axles 1—2 (change of direction of the vehicle) it is necessary, in these conditions, to raise the gravity center of the axle 10 and with it, the weight of the load supported thereby.

The other way of eliminating this instability consists in making use of one or two springs 23, as shown on Figure 5, the object of which is to balance the action of the components m and n of the weight.

A second embodiment of my invention for obtaining the automatic steering of the wheels of the supplementary axle in running forward and backwards is shown in Figs. 6 and 7. In each wheel support 15 there is mounted an arm or link 16 capable of turning around the axle 17 which is oscillatorily mounted upon the pivotal axle 1—2 of each wheel. It will be easily seen that this arm 16 can adopt the two different and approximately symmetric positions 15 and 15' due to the stops 18 and 19; the position 15 corresponding to a left turn of the vehicle of Fig. 7 and position 15' to a right turn. The change from position 15 to position 15' is obtained by manipulation from the driver's seat, of a rod 21 provided with a universal joint, 20. For facilitating the manœuvre and at the same time to reduce the effort to be exerted by the driver, it is convenient to apply the brakes to the wheel, to start a running with the motor of short duration in the new direction of running required, and actuating at the same time the shaft 21, thereafter locking this shaft immediately or the handle 16 in the new position; to release the brakes and continuing the running in the new direction selected. It will be observed that in this case points 12, 13, and 13', Figure 6, fulfill similar requirements that in the first design of the device previously specified.

In both solutions that have just been explained, means have been provided for altering the distance between articulations 8—8 of Jeantaud's parallelogram, that is to say, means for altering the length of the bar that connects both wheel supports in said parallelogram, without having to alter in any way the relative position of the two wheels of each supplementary shaft with the object that will be clearly described. To this effect, threads have been provided on screws 9—9' and the compensating ring.

Considering now the third modified form conceived for obtaining the automatic steering of the supplementary axle, in back and forward running, this construction consists of a common axle 25—25 with fixed wheel supports (not pivotally mounted) see Figures 8 and 9, said axle being invariably fixed to a cleat 26 which, through axle 24 can make a complete turn) is around said axle 24 which must not cut the horizontal axle 25—25 i. e. they must both be in the same plane.

It is understood that Figures 8 and 9 are diagrammatically presented since little attention has been given in them to the connection of the new device to the frame; neither have the springs been illustrated, which springs are required between the device and the frame. It is quite obvious in which manner the device operates. In the position shown, the vehicle running in the direction indicated by the arrow. When the direction is reversed, axle 25—25 loses its stability with relation to axle 24 and, in completing the turn, occupies the position 25' 25' since it tends always to be drawn by the vehicle.

The advantages obtained from the foregoing construction are of considerable importance.

Having now particularly ascertained and described my invention and how same can be readily carried into practice, I declare that what I claim is—

1. A device of the character described comprising an axle rotatably mounted in aligned, horizontal bearings; a spindle pivotally mounted on each end of said axle; a wheel for each spindle; and means secured to said axle for rotating the axle in order to obtain different positions.

2. A device of the character described comprising an axle rotatably mounted in aligned, horizontal bearings; a spindle pivotally mounted on each end of said axle; a wheel for each spindle; means secured to the said axle for rotating same in order to obtain different positions; and a spring for each spindle secured at one end to the axle and the other end to the wheel spindle for eliminating the unstable equilibrium resulting from the deflection of each wheel spindle.

In testimony whereof I affix my signature.

JOSÉ LUIS DELPINI.